United States Patent
Pesahl et al.

(10) Patent No.: US 6,865,938 B2
(45) Date of Patent: Mar. 15, 2005

(54) DEVICE FOR MEASURING THE MASS OF AIR FLOWING INSIDE A LINE

(75) Inventors: Stefan Pesahl, Saal A. D. Donau (DE); Jürgen Scheibner, Thalheim (DE); Kai Schurig, Regensburg (DE); Stephen Setescak, Pentling (DE); Frank Steuber, Bad Abbach (DE); Andreas Wildgen, Nittendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/744,739

(22) Filed: Dec. 22, 2003

(65) Prior Publication Data

US 2004/0134272 A1 Jul. 15, 2004

Related U.S. Application Data

(63) Continuation of application No. PCT/DE03/01311, filed on Apr. 22, 2003.

(30) Foreign Application Priority Data

Apr. 22, 2002 (DE) .......................................... 102 17 884

(51) Int. Cl.$^7$ ................................................. G01F 1/68
(52) U.S. Cl. ................................................. 73/204.22
(58) Field of Search ............................... 73/202, 202.5, 73/118.2, 204.22

(56) References Cited

U.S. PATENT DOCUMENTS

| | | | | |
|---|---|---|---|---|
| 5,595,163 A | * | 1/1997 | Nogi et al. .................. | 123/494 |
| 5,847,275 A | | 12/1998 | Kondo et al. | |
| 5,939,628 A | * | 8/1999 | Igarashi et al. ............... | 73/202 |
| 6,182,639 B1 | | 2/2001 | Igarashi et al. | |
| 6,308,553 B1 | * | 10/2001 | Bonne et al. ................. | 73/1.35 |
| 6,422,070 B2 | * | 7/2002 | Reymann et al. .......... | 73/118.2 |

FOREIGN PATENT DOCUMENTS

| | | |
|---|---|---|
| DE | 44 07 209 A1 | 9/1995 |
| DE | 196 24 493 A1 | 1/1997 |
| EP | 0 441 523 A1 | 8/1991 |
| WO | 02/25223 A1 | 3/2002 |

* cited by examiner

*Primary Examiner*—Edward Lefkowitz
*Assistant Examiner*—Jewel V. Thompson
(74) *Attorney, Agent, or Firm*—Laurence A. Greenberg; Werner H. Stemer; Gregory L. Mayback

(57) ABSTRACT

An air mass sensor has a three-part configuration formed of an insertion element, a measuring channel element and a housing element for accommodating an evaluation device. In order to be able to provide flexible insertion elements for a device having a short overall height, the measuring channel element and the housing element are joined to one another along a side of the measuring channel element that is perpendicular to the main direction.

24 Claims, 3 Drawing Sheets

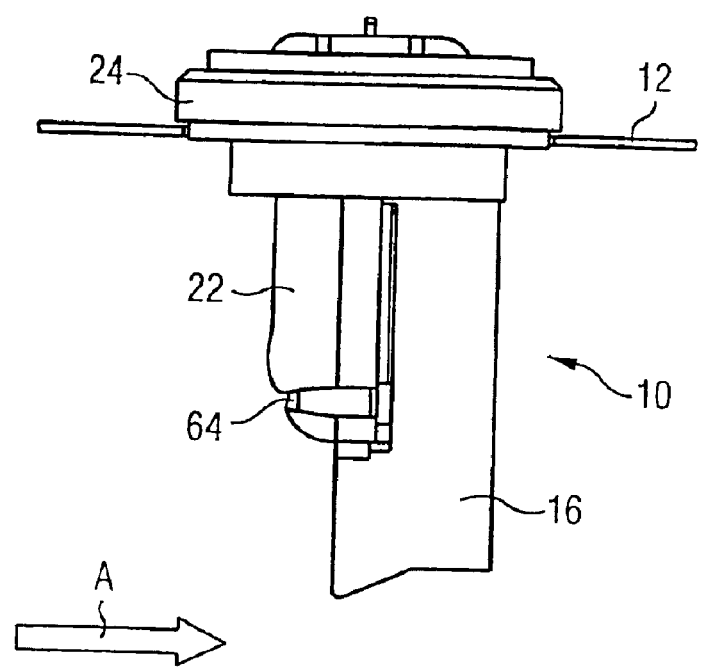

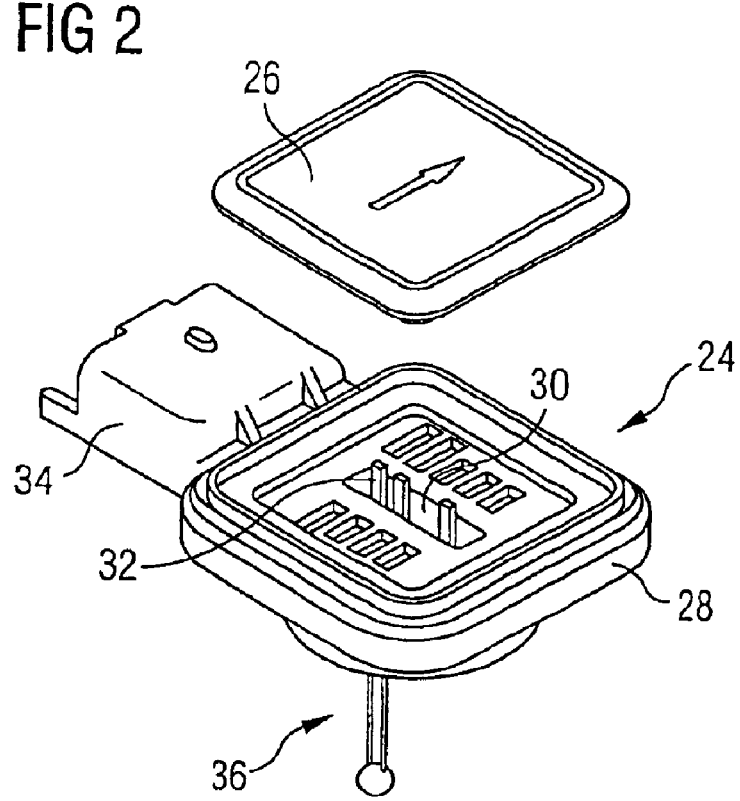
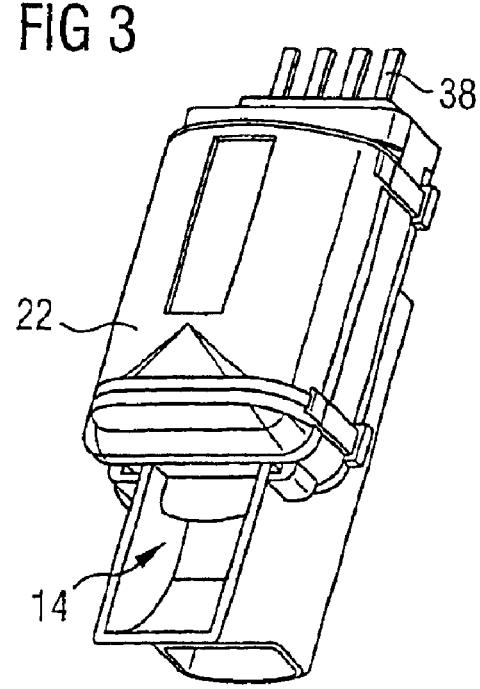

DEVICE FOR MEASURING THE MASS OF AIR FLOWING INSIDE A LINE

CROSS-REFERENCE TO RELATED APPLICATION

This application is a continuation of copending International Application No. PCT/DE03/01311, filed Apr. 22, 2003, which designated the United States and was not published in English.

BACKGROUND OF THE INVENTION

Field of the Invention

The invention relates to a device for measuring the mass of air flowing inside a line. A device of this type is also referred to for short as an air mass measuring device or an air mass sensor.

The device is inserted into the intake channel for the air mass, as a result of which a defined portion of the total air flow flows through this device. The known insertion channel air mass measuring devices is formed essentially of a measuring channel in which a sensor is disposed, the electronics for the sensor which are disposed in a housing, and also an insertion element which inserts the measuring channel into the line.

Air mass sensors in the induction port of internal combustion engines are sufficiently known. They are used in order to detect the air mass taken in for the cylinders of the internal combustion engine and thus to enable the engine control unit to correctly set the air/fuel mixture along with other operational parameters. The mode of operation of the air mass sensor will not be described in detail in this patent specification.

A device for measuring the mass of a medium flowing in a line is known from Published, Non-Prosecuted German Patent Application DE 44 07 209 A1, corresponding to U.S. Pat. No. 6,422,070, whereby the housing for the electronics for the sensor projects into the intake line. Downstream of the electronics housing in the insertion direction follows the bypass channel with the sensor carrier. With regard to this configuration, the insertion element, the electronics for evaluating the sensor signals and the measuring channel are situated in series in the insertion direction. The disadvantage of this configuration for the air mass sensor is the fact that the latter requires a large construction length that can lead to installation problems, particularly in the case of small pipe diameters or low space availability in the engine area.

An air mass measuring device is known from U.S Pat. No. 5,939,628, whereby the electronics for evaluating the measuring sensors are integrated into the insertion element and in this situation are located outside the intake line. Although the air mass measuring device has a shorter overall construction, the integration of the electronics into the insertion element does however lead to the fact that minor constructional changes to the insertion element are comparatively costly. In particular, a constructional change to the insertion element makes it necessary to carry out a costly adaptation to the mounting support for the evaluation electronics and possibly to the electronics themselves if an electrical plug-in connection for connecting the measuring device to an engine control unit needs to be differently aligned or needs to be configured for other plug-in connections.

SUMMARY OF THE INVENTION

It is accordingly an object of the invention to provide a device for measuring the mass of air flowing inside a line which overcomes the above-mentioned disadvantages of the prior art devices of this general type, which has a short construction length that permits flexible adaptation to a wide variety of installation situations.

With the foregoing and other objects in view there is provided, in accordance with the invention, a device for measuring an air mass flowing inside a line. The device contains at least one measuring sensor, and a measuring channel element having a side, an outlet opening formed therein, and an inlet opening formed therein and into which a portion of the air mass flowing in a main direction of flow enters, flows around the measuring sensor and exits back into the line by way of the outlet opening. An insertion element is provided and when placed into an opening in the line projects into the line. An evaluation device receives signals generated by the measuring sensor. A housing element accommodates the evaluation device. The insertion element holds the housing element and the measuring channel element in the line. The housing element is disposed against the side of the measuring channel element plugged into the line, and the housing element is disposed perpendicular to the main direction of flow of the air mass.

The device according to the invention has a measuring channel element, into which a defined portion of the air mass to be measured enters by way of an inlet opening as an air stream. The air stream flows around at least one measuring element and exits into the line by way of an outlet opening. In its installed position the measuring channel element is plugged into the line. The air mass measuring device according to the invention has an insertion element which when placed into an opening in the line plugs the measuring channel element into the line. In addition, the device according to the invention has a housing element that has an evaluation device for receiving signals from the sensor elements. The housing element and/or the measuring channel element can be connected to the insertion element and, when connected, are held by the latter. With regard to the air mass measuring device according to the invention, the housing element and/or the measuring channel element is provided with a connection device which holds the housing element in the line against a side of the measuring channel element disposed perpendicularly with respect to the main direction of flow. The main direction of flow is the direction of flow of the undisturbed air mass in the line. In the connected state, the housing element and the measuring channel element are therefore connected to one another laterally. With regard to the solution according to the invention, an excessively long construction length is avoided as a result of the lateral configuration of the elements. At the same time, as a result of incorporating the evaluation device into the housing element and into the line, this ensures that concrete requirements applying to the insertion element can be realized independently of the evaluation device. A further advantage that has become apparent is the fact that the small distance between sensors in the measuring channel and evaluation electronics results in good electromagnetic compatibility.

The housing element has an essentially flat electronics substrate as the evaluation device, whereby the normal direction of the electronics substrate is disposed parallel to the main direction of flow in the line.

In a preferred embodiment, the housing element is provided with devices for electrical and mechanical connection with the insertion element. With regard to the air mass measuring device according to the invention, the housing element is connected to the insertion element and the measuring channel element is connected to the housing element. The connection of the housing element to the insertion element is also effected by way of electrical devices such that the signals from the evaluation device can be forwarded by way of the insertion element to a control unit.

By preference, the housing element is constructed with a base element and a cover element, between which is disposed the electronics substrate. The cover element is provided with cross-pieces which are connected to the measuring channel element when the device is in the assembled state.

The housing element is preferably disposed on the upstream facing side of the measuring channel element and has a convex shaped cover element.

In accordance with the invention, the base element has solder tags connecting the measuring sensor to the evaluation device on a side of the housing element facing the measuring channel element. The base element has a recess formed therein through which the solder tags connect the measuring sensor to the evaluation device.

In a preferred embodiment, the evaluation device has a substantially flat element which is connected to the base element by way of a shaped adhesive part provided with an adhesive on both sides and which seals the recess. The use of shaped adhesive parts is already known. With regard to this embodiment, a substantially flat element, preferably the electronics substrate, is secured in such a manner in the evaluation device that its recess is sealed.

In another embodiment, the insertion element additionally has a pin-shaped temperature sensor that protrudes from the insertion element and through the opening into the line.

In a further embodiment, the housing element is provided with a drainage recess located crosswise with respect to the insertion direction. The recess prevents the ingress of splashing water, which has condensed on the housing element, into the inlet opening.

Other features which are considered as characteristic for the invention are set forth in the appended claims.

Although the invention is illustrated and described herein as embodied in a device for measuring the mass of air flowing inside a line, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, side-elevational view of an air mass sensor according to the invention;

FIG. 2 is a diagrammatic, exploded, perspective view of a connector element with a temperature sensor;

FIG. 3 is a perspective view of a measuring channel with an electronics housing;

DESCRIPTION OF THE PREFERRED EMBODIMENTS

Figure 4:
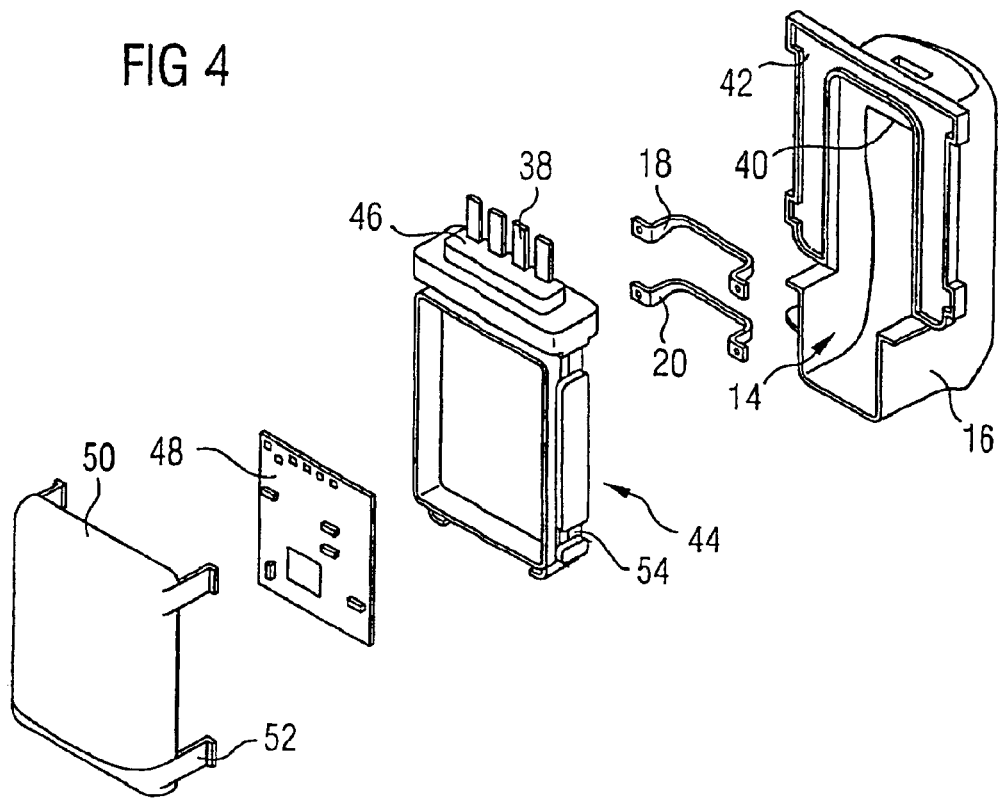
FIG. 4 is diagrammatic, exploded, perspective view of the measuring channel and the electronics housing.

Referring now to the figures of the drawing in detail and first, particularly, to FIG. 1 thereof, there is shown a side view of an air mass sensor 10. The air mass sensor 10 is inserted into an intake line 12. A main direction of flow of air is indicated by arrow A. One portion of the air mass stream enters a bypass channel of a bypass element 16 by way of an inlet opening (see FIG. 3). In the channel 16, the air is directed past two sensors 18 and 20 (FIG. 4). The sensors 18, 20 take the form for example of temperature-dependent resistors with resistance layers, so-called hot-film resistors, for measuring the mass of the air flowing past. The measuring principles for determining an air mass flowing past in the bypass channel 16 are known and do not require further description here.

On its upstream facing side the bypass channel 16 is provided with an electronics housing 22. The housing 22 is connected to the bypass channel 16, as illustrated in FIG. 3, which is described in detail below.

The electronics housing 22 is in turn connected to a connector element 24. The connector element 24 is inserted into an opening in the line 12 and holds both the electronics housing 22 and also the bypass channel 16. The connector element 24 is used as an insertion element.

FIG. 2 shows a perspective view of the connector element 24 in more detail. The connector element 24 has a cover 26 that is provided with an orientation arrow for indicating the main direction of flow. A body 28 of the connector element 24 has a slotted hole 30 containing electrical contacts 32. A connector terminal 34 leads away from the connector body 28 for forwarding the measurement signals to a non-illustrated engine control unit.

The connector body 28 is additionally provided with a temperature sensor 36. The temperature sensor takes the form of a so-called negative temperature coefficient (NTC) temperature sensor. When the measuring device is in the assembled state, the temperature sensor 36 is situated laterally beside the bypass channel 16 and downstream of the electronics housing 22.

As illustrated in FIG. 3, the electronics housing 22 is provided with the contact pins 38 which when inserted establish an electrical connection between evaluation electronics 48 and the connector element 24.

FIG. 4 shows the bypass element 16 with its opening 14 for the bypass channel. The bypass channel has a first section for the inflowing air and a second section that is connected to the first section by way of a deflection section. In the area of the deflection section, the first and second sections are separated from one another by a wall 40. The sensor carriers bearing the sensors 18 and 20 are disposed in the bypass channel. The channel element 16 has a flange 42 running around it, onto which a housing base element 44 is placed. The housing base element 44 is provided with the contact pins 38. The contact pins 38 project from a pedestal 46. Disposed in the base element 44 is the flat electronics substrate 48 that evaluates the measurement signals from the sensors 18 and 20 and forwards its results by way of the contact pins 38. Mounted onto the base element 44 is a housing cover 50 that is provided laterally with cross-pieces 52. The cross-pieces 52 are each disposed on longitudinal sides of the housing cover 50 close to the corners.

In order to connect the housing element 22 to the channel element 16, the electronics substrate 48 is inserted into the base element 44, as described in detail in the following with reference to FIG. 5. The cover 50 is put in place and the cross-pieces 52 are guided laterally past the base element 44 through recesses 54. On the flange 42 of the channel element 16 the cross-pieces 52 are connected to the latter for example by an adhesive or welding. The unit formed in this manner is inserted into the connector element 24 and the projection 46 is stuck or welded in the slotted hole 30. Subsequently, an. electrically conducting connection is established between the contact pins 38 and 32, by soldering for example.

Figure 5:
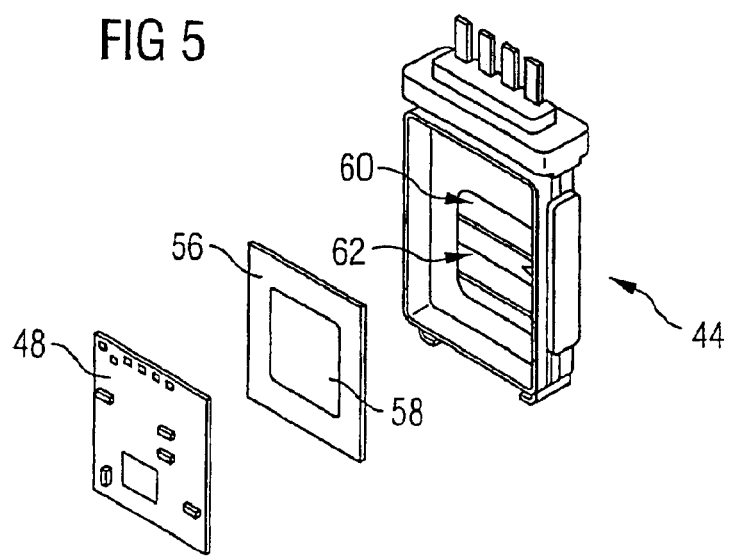
FIG. 5 is diagrammatic, exploded, perspective view of the electronics housing.

FIG. 5 illustrates the mounting of the electronics substrate 48 in the base element 44. The base element 44 has a non-illustrated spray-coated metal insert. A shaped adhesive part 56 with an adhesive on both sides is inserted into the base element 44. The shaped adhesive part 56 is provided with an opening 58. In the area of the opening 58, two solder tags 60 and 62 are provided for each of the sensor elements 18, 20. Only one of each pair of the two pairs of solder tags 60, 62 is visible in FIG. 5. The opening 58 is disposed such that the measuring sensors can be soldered to the solder tags 60 and 62 through the opening. The electronics substrate 48 mounted on the shaped adhesive part 56 seals an opening in the base element 44 and thus also the measuring channel element.

FIG. 1 additionally shows a drainage recess 64 running crosswise with respect to the direction of flow A which collects any water splashes occurring and drains the water off to the side in order to prevent it entering the inlet opening.

We claim:

1. A device for measuring an air mass flowing inside a line, the device comprising:
   at least one measuring sensor;
   a measuring channel element having a side transverse to a main direction of flow, an outlet opening, and an inlet opening, a portion of the air mass flowing in said main direction of flow entering into said inlet opening, flowing around said measuring sensor, and exiting back into the line by way of said outlet opening;
   an insertion element when placed into an opening in the line projects into the line;
   an evaluation device receiving signals generated by said measuring sensor; and
   a housing element accommodating said evaluation device;
   said insertion element holding said housing element and said measuring channel element inside the line, and said housing element being disposed against said side of said measuring channel element inside the line.

2. The device according to claim 1, wherein at least one of said housing element and said measuring channel element has a first device for providing an electrical connection and a second device for providing a mechanical connection with said insertion element.

3. The device according to claim 2, further comprising contact elements disposed in said insertion element, and said first device has contact pins electrically connected to said contact elements in said insertion element.

4. The device according to claim 3, wherein said housing element contains a base element and a cover element, and said evaluation device is disposed between said base element and said cover element.

5. The device according to claim 4, wherein said evaluation device holds said measuring sensor.

6. The device according to claim 4, wherein said cover element has cross-pieces connected to said measuring channel element.

7. The device according to claim 1, wherein said housing element has a downstream facing side connected to said measuring Channel element.

8. The device according to claim 7, wherein said housing element has an upstream facing side with a convex shape.

9. The device according to claim 4, wherein said base element has solder tags connecting said measuring sensor to said evaluation device on a side of said housing element facing said measuring channel element, said base element has a recess formed therein through which said solder tags connect said measuring sensor to said evaluation device.

10. The device according to claim 9, wherein:
    said housing element has a shaped adhesive part with an adhesive on both sides; and
    said evaluation device has a substantially flat element connected to said base element by way of said shaped adhesive part provided with said adhesive on both sides and seals said recess.

11. The device according to claim 1, wherein said insertion element has a pin-shaped temperature sensor disposed on a side of said insertion element facing the line and, when said insertion element is mounted, protrudes through the opening into the line.

12. The device according to claim 1, wherein said housing element has a drainage recess formed therein running crosswise with respect to an insertion direction.

13. A device for measuring an air mass flowing inside a line, the device comprising:
    at least one measuring sensor;
    a measuring channel element having a side, an outlet opening formed therein, and an inlet opening formed therein,
    a portion of the air mass flowing in a main direction of flow entering into said inlet opening, flowing around said measuring sensor, and exiting back into the line by way of said outlet opening;
    an insertion element when placed into an opening in the line projects into the line;
    an evaluation device having a substantially flat electronics substrate and receiving signals generated by said measuring sensor; and
    a housing element accommodating said evaluation device;
    said insertion element holding said housing element and said measuring channel element inside the line, and said electronics substrate being disposed together with said housing element inside the line such that a normal direction of said electronics substrate substantially runs parallel to the main direction of flow inside the line.

14. The device according to claim 13, wherein at least one of said housing element and said measuring channel element has a first device for providing an electrical connection and a second device for providing a mechanical connection with said insertion element.

15. The device according to claim 14, further comprising contact elements disposed in said insertion element, and said first device has contact pins electrically connected to said contact elements in said insertion element.

16. The device according to claim 15, wherein said housing element contains a base element and a cover element, and said evaluation device is disposed between said base element and said cover element.

17. The device according to claim 16, wherein said evaluation device holds said measuring sensor.

18. The device according to claim 16, wherein said cover element has cross-pieces connected to said measuring channel element.

19. The device according to claim 13, wherein said housing element has a downstream facing side connected to said measuring channel element.

20. The device according to claim 19, wherein said housing element has an upstream facing side with a convex shape.

21. The device according to claim 16, wherein said base element has solder tags connecting said measuring sensor to said evaluation device on a side of said housing element facing said measuring channel element, said base element has a recess formed therein through which said solder tags connect said measuring sensor to said evaluation device.

22. The device according to claim 21, wherein:

said housing element has a shaped adhesive part with an adhesive on both sides; and said electronics substrate is connected to said base element by way of said shaped adhesive part provided with said adhesive on both sides for sealing said recess.

23. The device according to claim 13, wherein said insertion element has a pin-shaped temperature sensor disposed on a side of said insertion element facing the line and, when said insertion element is mounted, protrudes through the opening into the line.

24. The device according to claim 13, wherein said housing element has a drainage recess formed therein running crosswise with respect to an insertion direction.

* * * * *